US00RE37956E

(19) United States
(12) Reissued Patent
Blama

(10) Patent Number: US RE37,956 E
(45) Date of Reissued Patent: Jan. 7, 2003

(54) RADIO FREQUENCY IDENTIFICATION TAG AND METHOD

(75) Inventor: Michael J. Blama, Baltimore, MD (US)

(73) Assignee: C. W. Over Solutions, Inc., Aberdeen, MD (US)

(21) Appl. No.: 08/916,572

(22) Filed: Aug. 22, 1997

Related U.S. Patent Documents

Reissue of:
(64) Patent No.: 5,444,223
Issued: Aug. 22, 1995
Appl. No.: 08/179,664
Filed: Jan. 11, 1994

(51) Int. Cl.[7] ..... G06K 7/00
(52) U.S. Cl. ..... 235/435; 235/487; 235/492; 361/765; 361/766; 361/821
(58) Field of Search ..... 235/435, 492, 235/494, 487; 333/175, 185, 219; 343/895; 361/301.2, 763, 765, 782, 766, 821

(56) References Cited

U.S. PATENT DOCUMENTS

| | | | | |
|---|---|---|---|---|
| 3,958,105 | A | 5/1976 | Sidlauskas | 235/487 X |
| 3,970,824 | A | 7/1976 | Walton et al. | 235/487 X |
| 4,142,674 | A | 3/1979 | Walton | 235/492 |
| 4,560,445 | A | 12/1985 | Hoover et al. | 204/15 |
| 4,583,099 | A | 4/1986 | Reilly et al. | 343/895 |
| 4,612,877 | A | 9/1986 | Hayes et al. | 119/156 |
| 4,688,026 | A | 8/1987 | Scribner et al. | 340/572 |
| 4,694,283 | A | 9/1987 | Reeb | 340/572 |
| 4,745,401 | A | 5/1988 | Montean | 340/572 |
| 4,882,569 | A | 11/1989 | Dey | 340/572 |
| 4,910,499 | A | 3/1990 | Benge et al. | 340/572 |
| 5,103,210 | A | 4/1992 | Rode et al. | 340/572 |
| 5,108,822 | A | 4/1992 | Imaichi et al. | 428/209 |
| 5,119,070 | A | 6/1992 | Matsumoto et al. | 340/572 |
| 5,159,332 | A | 10/1992 | Walton | 340/825.54 |
| 5,218,189 | A | 6/1993 | Hutchison | 235/439 |
| 5,381,137 | A | 1/1995 | Ghaem et al. | 340/572 |
| 5,444,223 | A | 8/1995 | Blama | 235/435 |
| 5,447,779 | A | 9/1995 | Imaichi et al. | 428/209 |
| 5,510,769 | A | 4/1996 | Kajfez et al. | 340/572 |
| 5,589,251 | A | 12/1996 | Imaichi et al. | 428/209 |

FOREIGN PATENT DOCUMENTS

| | | |
|---|---|---|
| JP | 2-195491 | * 8/1990 |
| WO | WO/83 04448 | * 12/1983 |

* cited by examiner

*Primary Examiner*—Karl D. Frech
(74) *Attorney, Agent, or Firm*—Irah H. Donner, Esq.; Hale and Dorr LLP

(57) ABSTRACT

A method of and apparatus for identifying an item to or with which a radio frequency identification tag is attached or associated is provided. The tag is made of a nonconductive material to have a flat surface on which a plurality of circuits are pressed, stamped, etched or otherwise positioned. Each circuit has a capacitance and an inductance. The capacitance is formed from the capacitive value of a single capacitor. The inductance is formed from the inductive value of a single inductor coil having two conductive ends each connected to the capacitor. Each tag is associated with a binary number established from a pattern of binary ones and zeros which depend on the resonance or nonresonance of each circuit, respectively and the circuits position with respect to the binary table. The binary number may be converted to a decimal number using the binary table for conversion.

40 Claims, 9 Drawing Sheets

| COORESPONDING DECIMAL VALUE> | 8 | 4 | 2 | 1 | |
|---|---|---|---|---|---|
| | BIT 4 | BIT 3 | BIT 2 | BIT 1 | |
| 0 = OFF 1 = ON | 0 | 0 | 0 | 1 | = 1 |
| | 0 | 0 | 1 | 0 | = 2 |
| | 0 | 0 | 1 | 1 | = 3 |
| | 0 | 1 | 0 | 0 | = 4 |
| | | AND SO ON... | | | |

EXAMPLES:

THE BINARY NUMBER 0001 IS EQUIVALENT TO DECIMAL 1.
THE BINARY NUMBER 0011 IS EQUIVALENT TO DECIMAL 3.
THE BINARY NUMBER 1001 IS EQUIVALENT TO DECIMAL 9.

FIG.6

RADIO FREQUENCY IDENTIFICATION TAG AND METHOD

Matter enclosed in heavy brackets [ ] appears in the original patent but forms no part of this reissue specification; matter printed in italics indicates the additions made by reissue.

FIELD OF THE INVENTION

The present invention relates generally to electronic items identification systems and more particularly, to a radio frequency (RF) identification tag and method for identifying an item to or with which the tag is attached or associated, respectively, wherein each tag includes a plurality of circuits having a capacitance made up of a single capacitor and an individual made up of a single inductor coil which capacitor and inductor coil are in one-to-one correspondence such that each capacitor and inductor coil pair have a unique frequency at which the circuit resonates.

BACKGROUND OF THE INVENTION

Currently, electronic item identification systems are in widespread use today to identify a variety of items. A first type of electronic item identification system commonly used in industry is one in which bar code labels are used to identify items. These types of electronic item identification systems are typically used by supermarkets, distributors, shipping services and clothing retailers to scan the bar code labels for quick retrieval of an item's price or other information.

The way conventional bar code identification systems work is as follows. Bar codes labels are made up of a series of lines of varying widths or thicknesses to establish a code which can be read by a scanner. A bar code label is usually read by a laser scanner. The data from the scanner is electronically fed to a receiver which determines the identification code or number associated with the bar code label. The identification code or number is then sent to a central processing unit or computer where each code or number is matched to data stored on a master list such as item price or other information. The central processing unit or computer then electronically sends the stored data associated with the identification code or number to the cash register or other tabulator to arrive at a final total or tabulated result.

Another system of electronic item identification uses radio frequency (RF) identification tags to identify items. Radio frequency (RF) identification tags can be used to identify a variety of items to which the tags are attached or otherwise associated. In particular, radio frequency (RF) identification tags are currently used to identify passengers, luggage, library books, inventory items and other articles. Radio frequency (RF) identification tags will allow electronic identification of people or objects, moving or stationary, at distances of several feet.

In recent years, radio frequency identification tags have been manufactured using silicon chips. The silicon chips have been revolutionary because in the area of the size of the head of a pin, a silicon chip can hold a myriad of components and information. The problem with silicon chip radio frequency item identification tags is that silicon is very expensive and cannot be produced in the quantities necessary in industries such as the airline industry to make the tags feasible. Furthermore, the silicon chip identification tags are disadvantageous in having a limited range of approximately two feet and using a scanner that sends out only one signal which the chip alters by means of a phase shift. It would be desirable to develop a radio frequency identification tag that could be manufactured in mass quantities on a less expensive material than silicon such as paper or plastic and that could be used without having to alter the circuits on the tags in any way.

Other types of currently available radio frequency (RF) identification tags have the disadvantage that only recognition and surveillance functions can be performed. The radio frequency (RF) identification cards presently available in these types of systems do not to have the electronic properties necessary to allow for interrogation and identification functions.

For example, U.S. Pat. No. 4,694,283 to Reeb and U.S. Pat. No. 4,910,499 to Benge et al. both teach electronic identification systems which use multilayered radio frequency (RF) identification tags. The tags taught by the Reeb and Benge et al. patents each have conductive layers separated by a layer of di-electric material in order to form a resonant circuit. However, the Reeb patent teaches an electronic surveillance device and the Benge et al. patent teaches an anti-theft device, both of which are only usable for recognition and do not have the electronic properties necessary to allow for identification.

This is because the recognition function requires only one possibility, i.e., either resonant or not resonant. The identification function requires that the resonant frequency of the tag be read and then compared to another frequency to which it will match to achieve identification. It would be desirable for a radio frequency (RF) identification card to have the proper electronic properties to allow both recognition and identification functions to be performed with the card on an inexpensive material.

Some presently available radio frequency (RF) identification cards operate on the principle of establishing a code through the use of a pattern of binary numbers such as "ones" and "zeros". These type of electronic item identification systems have the disadvantage that the radio frequency (RF) identification tag includes a circuitry for initially establishing a resonant circuit having a first resonating frequency which tag is activated by changing the resonating frequency of the resonant circuit to a second resonating frequency.

For instance, U.S. Pat. No. 5,218,189 to Hutchinson discloses a binary encoded multiple frequency RF identification tag and U.S. Pat. No. 5,103,210 to Rode et al. discloses an activatable/deactivatable security tag. The tags of both patents are used for identifying an item to which the tag is attached or with which the tag is associated. The tags both include an inductance connected in parallel with a capacitance wherein the capacitance is made up of a plurality of individual capacitors. The Hutchinson patent teaches individual capacitors which each have a predetermined different capacitance and which are connected in series and the Rode et al. patent teaches two capacitance branches which each have a predetermined different capacitance wherein the individual capacitors of each branch are connected in series.

In other words, according to the teachings of the Hutchinson and Rode et al. patents, the binary number generated from the circuit needs to be detected by varying the circuit's total capacitance in order to check for resonance at a predetermined frequency. It would be desirable to develop an electronic item identification system using a radio frequency (RF) identification tag wherein each circuit on the tag has a constant inductance and capacitance and thus the circuit itself does not have to be changed to check for the resonating frequency.

The devices of the Hutchinson and Rode et al. patents short out capacitors during interrogation and thus the circuit can never be restored to its original frequency to be read over again. It would be desirable to develop an electronic item identification system in which the radio frequency (RF) identification tag can be read any number of times while still generating the same binary number as was read the first time and in this manner the tag can be reused.

The Hutchinson and Rode et al. patents teach a device where the binary number to be obtained from the tag must be predetermined. This is because the device teaches the "dimpling" of capacitors which to be accurate must be done with expensive, precision equipment. It would be desirable to develop an electronic item identification system in which a radio frequency (RF) identification tag having numerous circuits made up of capacitor/inductor coil pairs at evenly spaced intervals on the surface of the tag so that the presence or absence of a circuit or the circuit's functionability could be programmed at the point of use with inexpensive equipment.

SUMMARY OF THE INVENTION

The present invention provides a radio frequency (RF) identification tag for identifying an item attached to or associated with the tag. The tag includes numerous circuits, $C_1$ through $C_N$, each having a capacitance and an inductance. The capacitance is formed by a single capacitor and the inductance is formed by a single inductor coil. The inductor coil is preferably wound around the capacitor to form a capacitor and inductor coil pair each of which have a unique resonant frequency. A scanner is used to transmit a frequency to the circuits. If any of the circuits located on the tag are resonant at the frequency transmitted, a binary number "1" is recorded for that circuit's location. A circuit that is not resonant within the frequency range of the transmitted signal is given a binary number "0" and that circuit's location is recorded. Once all circuits from $C_1$ to $C_N$ have been scanned and assigned a binary "1" or "0", a decimal number is calculated through the use of the binary table.

BRIEF DESCRIPTION OF THE DRAWING FIGURES

FIGS. 1(a) and 1(b) are perspective views of the radio frequency (RF) identification tag of the present invention showing paper and plastic tags, respectively, having numerous circuits, $C_1$ through $C_N$.

Figure 4A:
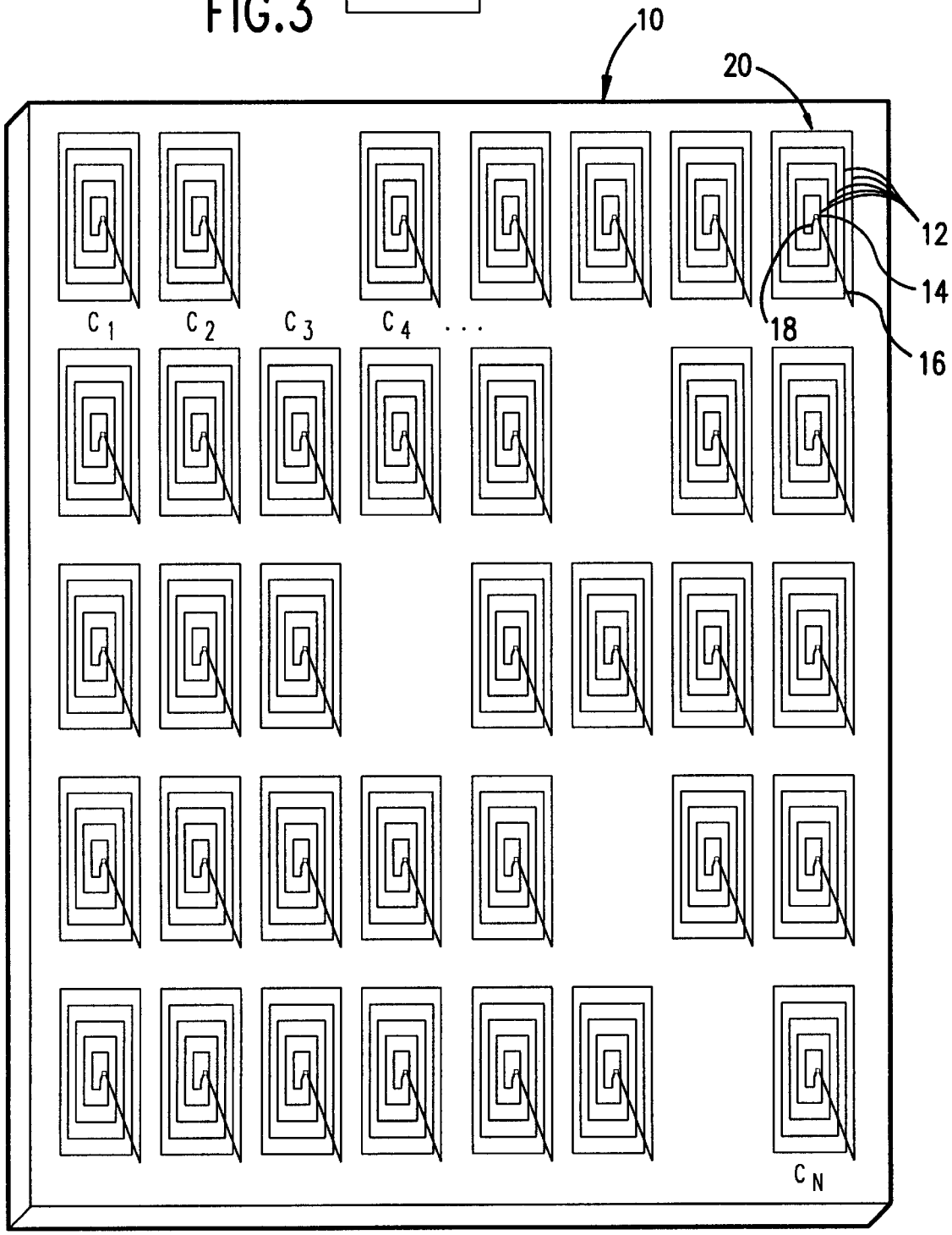
Figure 4B:
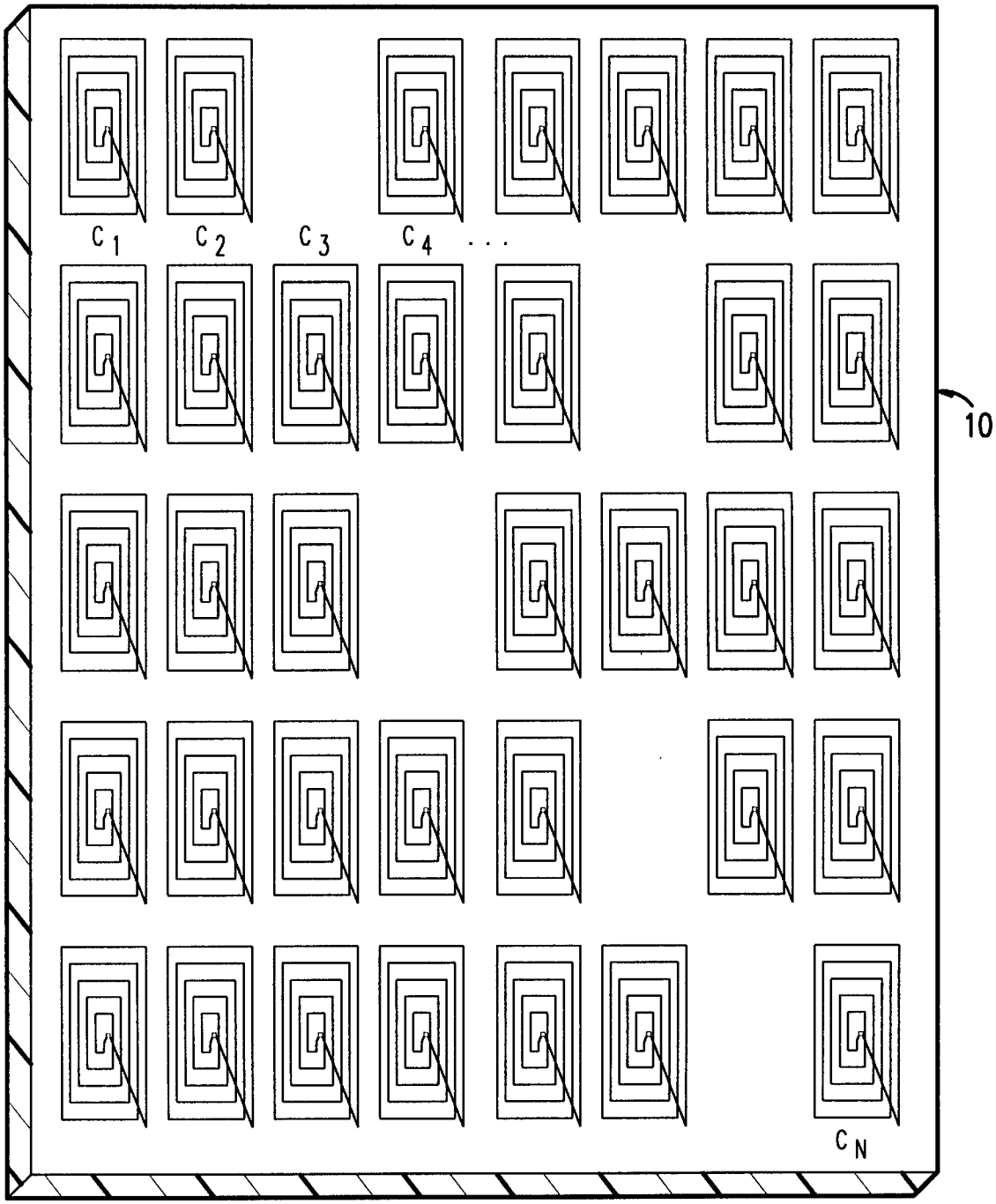

FIGS. 4(a) and 4(b) are perspective views of a radio frequency (RF) identification tag showing paper and plastic tags, respectively, having unprinted circuits.

Figure 5A:
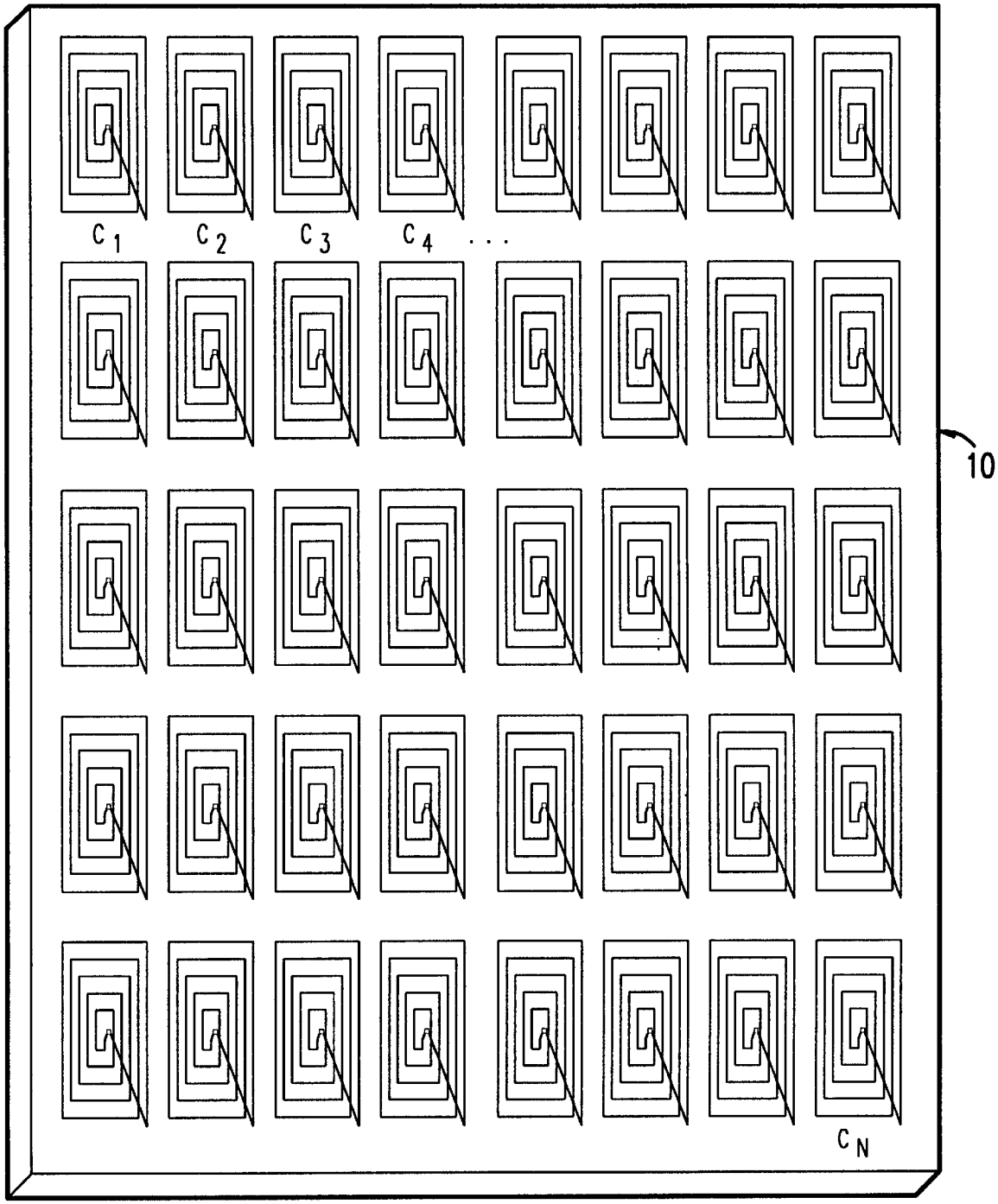
Figure 5B:
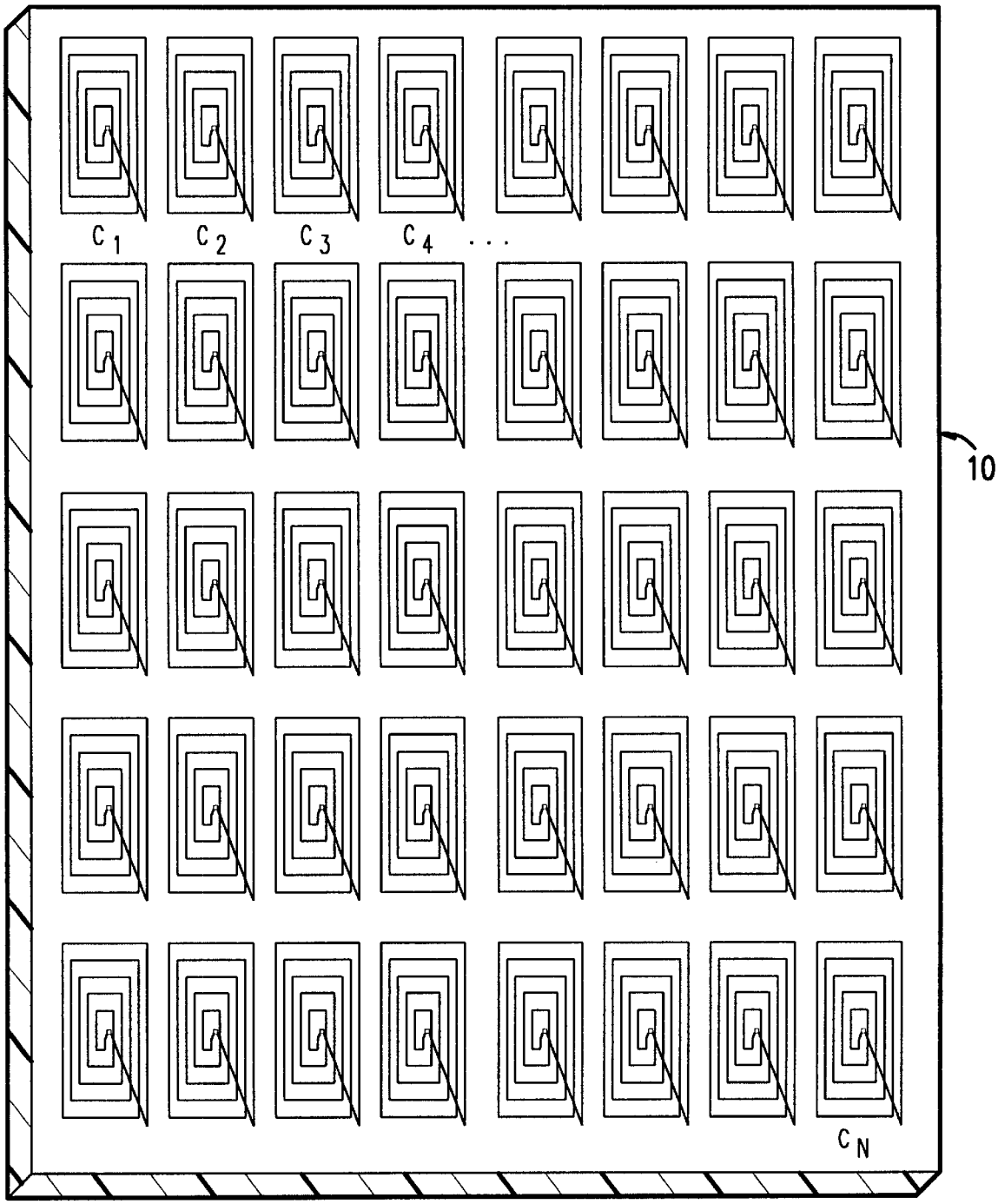
Figure 7A:
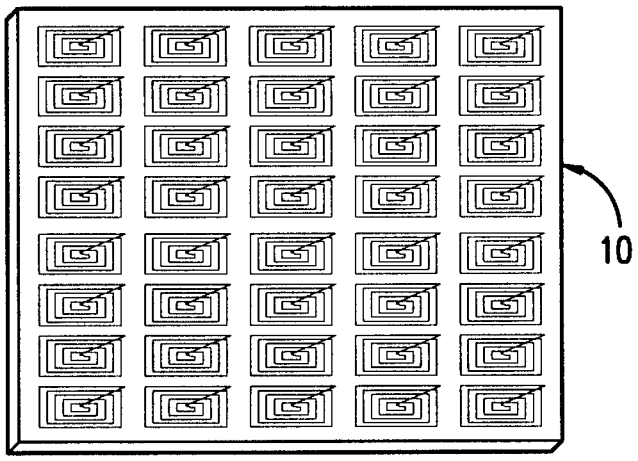
Figure 7B:
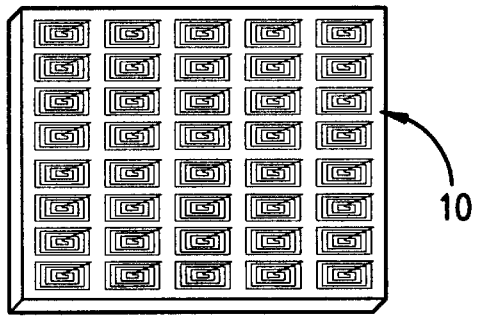
Figure 7C:
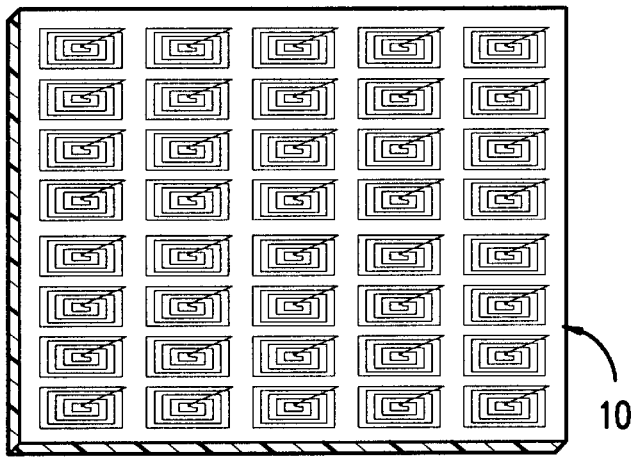
Figure 7D:
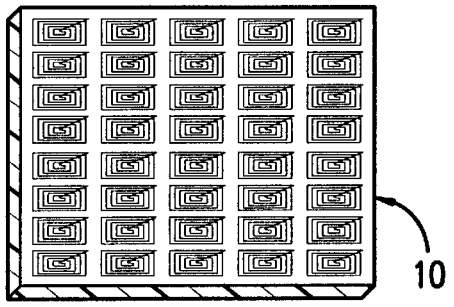

FIGS. 5(a) and 5(b) are perspective views of a radio frequency (RF) identification tag showing paper and plastic tags, respectively having disabled circuits.

FIG. 6 is an example of a binary table used to convert a binary number of "1"'s and "0"'s to a decimal number.

FIGS. 7(a) and 7(b) and FIGS. 7(c) and 7(d) are perspective views of paper and plastic radio frequency identification tags, respectively, having down-sized circuits.

Figure 8:
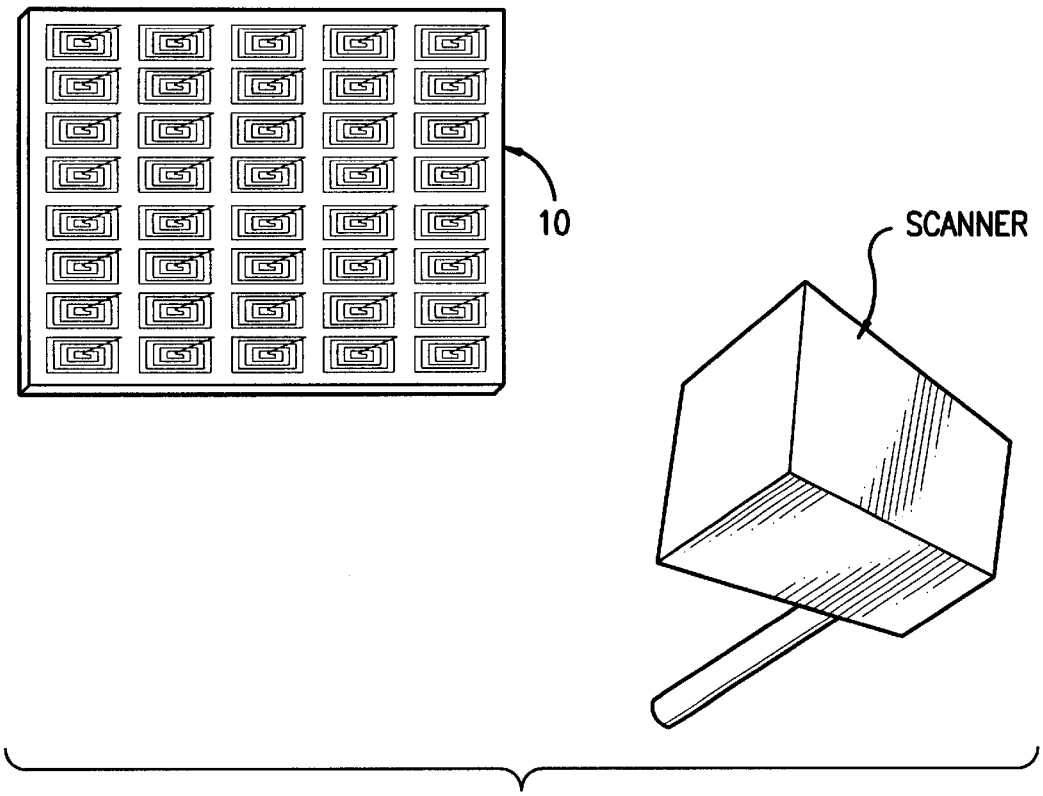

FIG. 8 is a schematic of a radio frequency identification tag and scanner.

Figure 9:
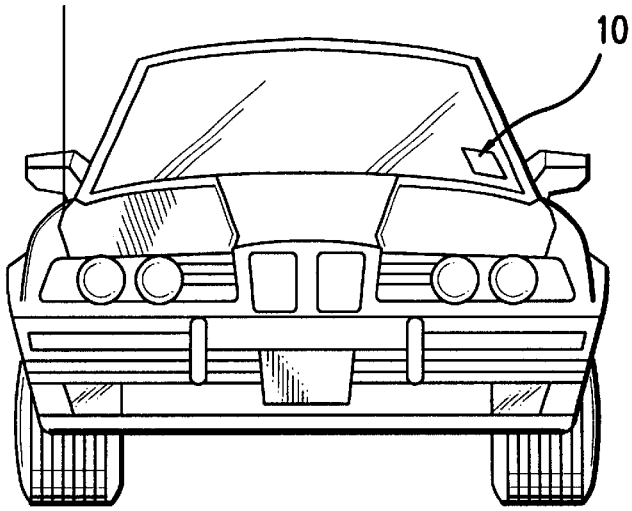

FIG. 9 shows an automobile having a radio frequency identification tag on the front windshield.

DETAILED DESCRIPTION OF THE INVENTION

The drawing figures illustrate features of the radio frequency (RF) identification tag 10 of the present invention which allows for electronic identification of people or objects, either stationary or moving, at distances of several feet. The identification tag 10 can be placed on merchandise, carried by people or animals, or even placed in automobile windshields, and interrogated by a scanning device or unit in order to establish an unique binary number for identification purposes from which a decimal number can be calculated using a binary table for conversion. The radio frequency (RF) identification tag 10 is passive in that it needs no power supply, but instead uses absorbed energy from the scanning unit.

Figure 1A:
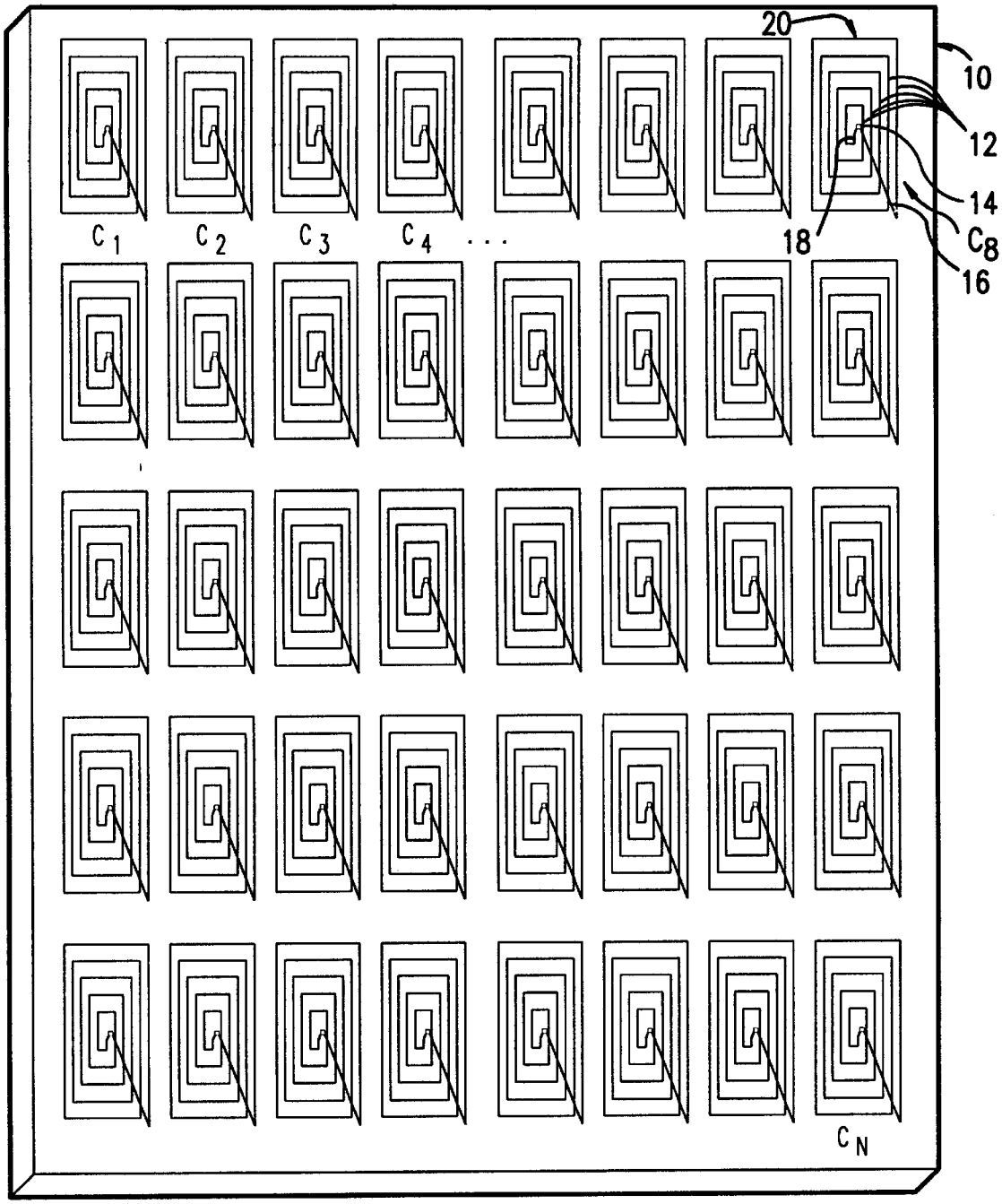
Figure 1B:
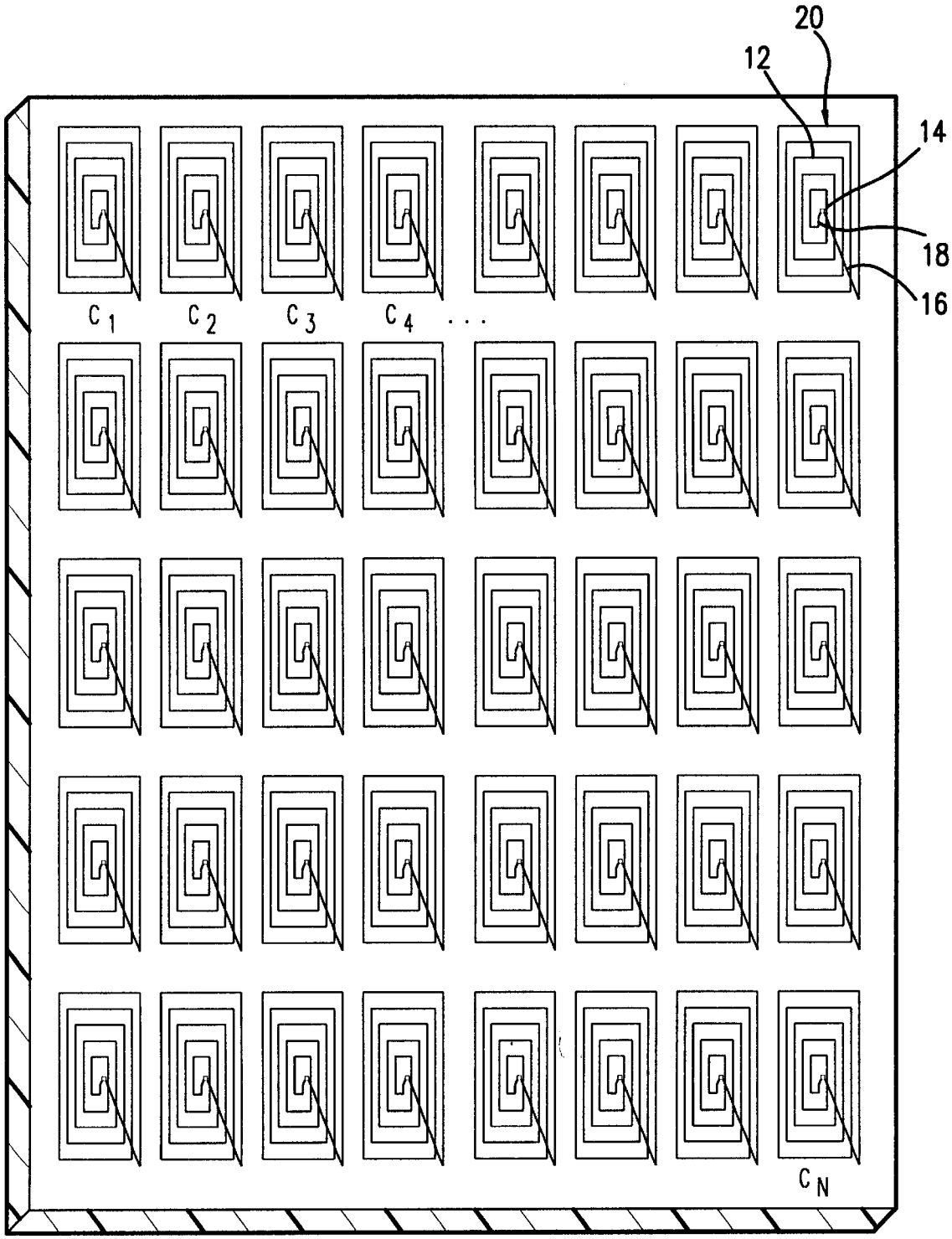

Referring to FIGS. 1(a) and 1(b), paper and plastic radio frequency (RF) identification tags 10, respectively, having numerous circuits, $C_1$ through $C_N$, is shown. Each of the numerous circuits, $C_1$ through $C_N$, are located at spaced intervals on the surface of the tag 10 at a distance far enough apart so that there is no electronic interference between adjacent circuits. The exact number of circuits, C1 through CN, on any individual tag 10 will vary depending on the tag's 10 application or use to determine the number of "bits" of information needed to be stored on the tag 10 which in turn determines the physical size and configuration of the tag 10 itself.

Even though FIGS. 1(a) and 1(b) show the circuits, C1 through CN, as being arranged in a system of columns and rows, the physical arrangement of the circuits, C1 through CN, on the tag is not limiting to the invention. The circuits, C1 through CN, may be positioned in any physical arrangement which allows the identification tag 10 to function in a manner within the spirit and scope of the invention.

The radio frequency (RF) identification tag 10 may range in size from as large as a typical 6 inch by 9 inch business envelope for practicality, although larger tags are certainly possible, to as small as 1 square inch. In other words, the individual tag 10 having N circuits may be down-sized from 6 inches by 9 inches to a tag 10 as small as 1 square inch still having N circuits, except that each circuit itself is smaller in size, in order to hold more circuits and bits of information in a smaller surface area. Referring to FIGS. 7(a) and 7(b) and FIGS. 7(c) and 7(d), in order to electronically down-size the paper and plastic identification tags 10, respectively the frequency of each circuit may have to be increased to a higher frequency range.

Figure 2:
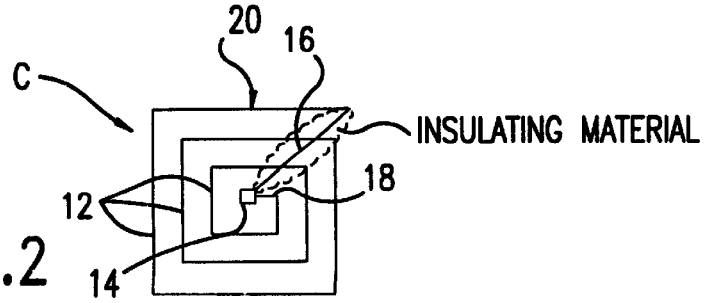
FIG. 2 is a top plan view of one the circuits, $C_1$ through $C_N$, of the radio frequency (RF) identification tag.

Referring to FIG. 2, a single circuit C representative of each circuit, $C_1$ through $C_N$, from the radio frequency (RF) identification tag 10 of the present invention is shown. The circuit C has an inductance "i" and a capacitance "c". The inductance "i" is preferably formed from the inductive value of a single inductor coil 12 and the capacitance "c" is preferably formed from the capacitive value of a single capacitor 14.

Figure 3:
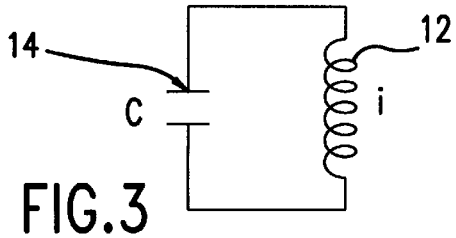
FIG. 3 is a schematic of the one of the circuits of the radio frequency (RF) identification tag.

The inductor coil 12 has two conductive ends 16, 18 each of the which are connected to the capacitor 14. The inductor coil 12 may be either wound around the capacitor 14 as shown in FIG. 2 or not wound around the capacitor 14 as is shown in the schematic in FIG. 3.

In the preferred embodiment of the present invention, the inductor coil 12 is a made from wire, foil, conductive ink or other conductive material which is etched, pressed, glued or printed onto a non-metallic surface such as paper, plastic, glass etc. The materials used for the inductor coil 12 and the identification tag 10 do not limit the invention nor does the method of attachment of the coil 12 to the tag 10.

As shown in FIG. 2, in the preferred embodiment of the invention one conductive end 18 of the inductor coil 12 is attached to the capacitor 14 so as to be contained in a layer below the layer of the main coil 20. The conductive end 16 is separated from contact with the main coil 20 by means of an insulating material place between the layers.

In the preferred embodiment of the present invention, the capacitance "c" of each circuit, $C_1$ through $C_N$, is formed from the capacitive value of a single capacitor 14. The capacitor 14 is preferably a small dot of dielectric material. The capacitor 14 may be formed by etching or trimming of the dielectric material electronically, or with a laser to exact specifications from a surface completely covered with dielectric material. Such dielectric surfaces can be manufactured in advance and then programmed to exact bit configurations upon demand.

Another method of forming the capacitor uses a machine, such as a laser printer, to etch the circuit's inductor coils 12 onto a paper or plastic surface that has been covered with a layer of dielectric material. In the same printing process, the printer would etch the capacitor 14. Although two separate methods of capacitor 14 formation have been described, it is understood that the type of material used for the capacitor 14 or the method of forming the capacitor 14 is not limiting to the invention and that any material or method within the spirit and scope of the invention may be used.

The theory of operation of each circuit, $C_1$ through $C_N$, is the simple electronic law of resonance. When an inductor coil and capacitor 14 are connected together, the resulting circuit C is a "tank" circuit which becomes resonant at a particular frequency $f_R$. The frequency $f_R$ is determined by the mathematical value of the inductor 12, i.e., the inductance "i" and the mathematical value of the capacitor 14, i.e., the capacitance "c". The resonance of a circuit, $C_1$ through $C_N$, can be detected by an interrogating or scanning device 22.

Referring to FIG. 8, the interrogator or scanner 22 used is a simple oscillator that generates and transmits or oscillate a frequency. If any of the capacitor 14 and inductor coil 12 circuits, $C_1$ through $C_N$, are found resonant at the particular frequency transmitted by the scanner, a "bit" of information is recorded in the form of a binary number "1" being located at a particular position on the tag 10. On the other hand, if resonance is not detected, that "bit" of information is interpreted as a binary number "0" being located at a particular position on the tag 10. This process of transmitting a frequency to check for resonance is repeated for as many times as there are number N of circuits, $C_1$ through $C_N$, and the whole process of interrogating a tag 10 having a plurality of circuits takes place in a very short time period.

A single circuit may have either 2 or 3 states. In a two state system, the circuit is simply resonant or nonresonant. This allows only 2 possible numbers, i.e., either a binary "1" or "0", respectively, at each circuit, $C_1$ through $C_N$. In a three state system, the circuit is not simply resonant or nonresonant but instead has high quality resonance, low quality resonance or is nonresonant.

The radio frequency (RF) identification tag 10 of the present invention will hold any number of "ganged" tuned circuits, $C_1$ through $C_N$, on its surface. Each circuit, $C_1$ through $C_N$, will be tuned to a unique frequency for detection of numerous N bits of information. In the preferred embodiment of the present invention, each circuit may be tuned to a unique frequency by either changing the length of the inductor coil 12 or changing the mass or value of the capacitor 14. These bits of information are assembled and converted into a decimal number by use of a binary table as shown in the example in FIG. 6.

Referring to FIG. 6, the example given is for a two state system where each of the circuits, $C_1$ through $C_N$, is either resonant at the frequency transmitted by the scanner 22 and thus, given a binary number "1" or nonresonant at the frequency transmitted by the scanner 22 and thus, given the binary number "0". The scanner interrogates all N circuits in the system to determine the circuit's binary number. From the resulting pattern of binary "1"'s and "0"'s established, a corresponding decimal value may be arrived at through the use of a binary table for conversion.

Because circuits, $C_1$ through $C_N$, may be either two state or three state, there are two possible methods of interrogation. A first possible method of interrogation is where each tuned circuit, $C_1$ through $C_N$, will represent a bit of information, either resonant, i.e., binary number "1", or not resonant, i.e., binary number "0". For instance, if there are to be 30 tuned circuits, $C_1$ through $C_{30}$, positioned on the radio frequency (RF) identification tag 10, 30 bits of information and 30 unique frequencies will be needed.

A second possible method of interrogation may be where each tuned circuit, $C_1$ through $C_N$, will be interrogated for resonance by interpreting high or low circuit "Q" which is the quality factor of the resonant circuit or its degree of resonance. This method would allow us 3 states or combinations, i.e., high resonance, low resonance or nonresonant, thus reducing the number of circuits and frequencies needed and the physical size of the radio frequency (RF) identification tag 10.

There are several methods of producing a circuit. The circuit can be etched or printed with conductive ink onto paper, plastic, glass or any non-metallic surface. In the preferred embodiment of the present invention, the circuits, $C_1$ through $C_N$, would be printed onto a piece of paper such as airline bag tags. The use of paper as the material for making the radio frequency (RF) identification tag 10 would make it extremely inexpensive, easy to manufacture in mass quantities and disposable.

Referring to FIGS. 4(a) and 4(b), one way of programming a particular decimal number onto the paper or plastic tags, respectively, would be to suppress printing of a "bit" of information or circuit, $C_1$ through $C_N$. In other words, a blank space would be left on the surface of the identification tag 10 where a circuit might otherwise have been printed or placed. The scanner would not detect that "bit" of information and would thus, interpret it as a binary "0".

Referring to FIGS. 5(a) and 5(b), another way to program the radio frequency (RF) identification tag 10 of the present invention is to mass produce paper or plastic tags with all circuits, $C_1$ through $C_N$, intact and disable the circuits needed to arrange the bit pattern for the number being programmed. The disablement of the circuit would preferably be accomplished by the disconnection of the conductive end 18 of the inductor coil 12 from the capacitor 14 although other methods of disablement may be used.

In operation, the scanning unit 22 will transmit a first frequency and wait for detection of resonance of one of the identification tag's 10 associated circuits, $C_1$ through $C_N$. After a sufficient time interval, the scanner will transmit or scan a second frequency and so on. The scanner will repeat these steps throughout all frequencies, depending on the number N of circuits, $C_1$ through $C_N$, until all N circuits have been interrogated. Then, for redundancy, the scanner may repeat all scans again to insure that the active bits have been detected by comparing them to the first scan results.

If the tap 10 is scanned for redundancy, after 2 of 3 successful compares, the bit pattern is sent to a simple binary to decimal conversion circuit for display or transmission to another device such as a personal computer or PC, mainframe computer, or other calculating or data storage device.

The present invention has been shown in the drawing figures and described in detail in its preferred embodiment for the purposes of illustration, however, variations and departures can be made therefrom by one of ordinary skill in the art without departing from the spirit and scope of the invention.

I claim:

1. A tag which uses radio frequency waves transmitted from a scanning device in order to identify an item to which said tag is attached or with which said tag is associated comprising:

an insulating layer having a top surface, a bottom surface, and side surfaces;

thin conductive metallic means adjacent either said top surface or said bottom surface of said tag for forming a plurality of circuits, wherein each circuit of said plurality of circuits has a unique resonant frequency formed by one-to-one correspondence of a capacitance made up of a single capacitor and an inductance made up of a single inductor coil having two conductive ends with a first conductive end being connected to said single capacitor in order for said inductor coil to wind around said capacitor to end in a second conductive end which crosses said single inductor coil in a layer above said inductor coil so that said second conductive end is above said inductor coil and separated from said inductor coil by an insulated layer in order for said second conductive end to connect to said capacitor to close each said circuit without shorting out the circuit; and wherein said tag is associated with a binary number established by a pattern of ones and zeros depending on each circuits' resonance or nonresonance, respectively, and each circuits' position on said tag with respect to a binary table.

2. The tag as in claim 1 wherein said capacitor is a dielectric dot.

3. The tag as in claim 2 wherein said inductor coil is made from a conductive material.

4. The tag as in claim 3 wherein said conductive ends of said inductor coil are connected to said capacitor in such a way so as to be in adjacent layers separated by an insulating material.

5. The tag as in claim 4 wherein said plurality of circuits are located on a surface of said tag at spaced intervals of a distance far enough apart so that adjacent circuits do not electronically interfere with each other.

6. The tag as in claim 5 wherein said tag associates a bit of information with each said circuit on said tag's surface.

7. The tag as in claim 6 wherein said tag is made of a nonconductive material.

8. The tag as in claim 7 wherein said nonconductive material of said tag is paper.

9. The tag as in claim 8 wherein said paper tag is disposable.

10. The tag as in claim 7 wherein said nonconductive material is plastic.

11. The tag as in claim 10 wherein said plastic tag is reusable.

12. The tag as in claim 7 wherein said pattern of binary ones and zeros is established by varying numbers and positions of circuits being left blank.

13. The tag as in claim 12 wherein said blank position on said tag was created by not printing or etching a circuit in a position where a circuit could have been printed or etched respectively.

14. The tag as in claim 13 wherein said pattern of binary ones and zeros is established by disabling a circuit on said tag.

15. The tag as in claim 7 wherein said nonconductive material of said tag is glass.

16. The tag as in claim 15 wherein said glass is located in a window of an automobile or other vehicle.

17. A method of identifying an item to or with which a radio frequency identification tag is attached or associated, respectively, comprising the method steps of:

providing said radio frequency identification tag having a top surface, a bottom surface and side surfaces with a plurality of circuits each having a capacitance and an inductance both located on either said top surface or said bottom surface of said tag to form a one-to-one correspondence and to have a resonating frequency wherein said capacitance comprises a single capacitor and said inductance comprises a single inductor coil such that said inductor coil has two conductive ends with a first conductive end connected to said capacitor in order for said inductor coil to wind around said capacitor and end in a second conductive end which crosses said single inductor coil in a layer above said inductor coil so that said second conductive end is above said inductor coil and separated from said inductor coil by an insulated layer in order for said second conductive end to connect to said capacitor to close each said circuit without shorting out the circuit;

using a scanning device to interrogate said circuits by means of said scanner transmitting varying radio frequency waves at which said circuits may resonate; and interrogating said circuits to establish a pattern of binary ones and zeros wherein a binary one is given to a resonant circuit and a binary zero a nonresonant circuit.

18. The method as in claim 17 wherein said step of providing a radio frequency identification tag with a plurality of circuits is accomplished by etching said surface of said tag which has been coated with a layer of conductive material.

19. The method as in claim 17 wherein said step of providing a radio frequency identification tag with a plurality of circuits is accomplished by printing onto or pressing into said surface of said tag a conductive material.

*20. A resonant circuit including a single capacitor, a single inductor coil electrically connected to said single capacitor, and an insulating layer separating from each other portions of at least one of said single capacitor and said single inductor coil that cross over each other, and said single capacitor and said single inductor disposed on a same surface of a substrate.*

*21. A resonant circuit as in claim 20, wherein said resonant circuit is tuned by at least one of changing a mass of the single capacitor and changing a length of the single inductor coil.*

*22. A resonant circuit as in claim 20, wherein said resonant circuit is associated with a three-state system established by resonating at a high quality level, resonating at a low quality level, or not resonating.*

*23. A resonant circuit as in claim 20, wherein said single inductor coil includes first and second ends, and each of said first and second ends are connected to said capacitor.*

*24. A resonant circuit as in claim 20, wherein said single inductor coil is of a first width substantially narrower than a second width of said capacitor.*

*25. A resonant circuit as in claim 24, wherein said single inductor coil is of a first length substantially longer than a second length of said capacitor.*

*26. A resonant circuit as in claim 20, wherein said single inductor coil is of a first length substantially longer than a second length of said single capacitor.*

*27. A resonant circuit having two opposing sides including a single capacitor, and a single inductor coil electrically connected to said single capacitor, and said capacitor and said single inductor coil are located on the same side of a resonance tag and disposed on a common surface of a substrate, wherein the substrate is adjacent to one of said two opposing sides of said resonant circuit.*

*28. A resonant circuit as in claim 27, wherein said resonant circuit is tuned by at least one of changing a mass of the single capacitor and changing a length of the single inductor coil.*

*29. A resonant circuit as in claim 27, wherein said resonant circuit is associated with a three-state system established by resonating at a high quality level, resonating at a low quality level, or not resonating.*

*30. A resonant circuit as in claim 27, wherein said single inductor coil includes first and second ends, and each of said first and second ends are connected to said single capacitor.*

*31. A resonant circuit as in claim 27, wherein said single inductor coil is of a first width substantially narrower than a second width of said single capacitor.*

*32. A resonant circuit as in claim 31, wherein said single inductor coil is of a first length substantially longer than a second length of said single capacitor.*

*33. A resonant circuit as in claim 27, wherein said single inductor coil is of a first length substantially longer than a second length of said single capacitor.*

*34. A resonant circuit which resonates radio frequency waves transmitted from a scanning device and having a resonant frequency associated therewith, comprising:*

*a first insulating layer having a top surface and a bottom surface;*

*a capacitance and an inductance having first and second ends and formed on one of the top surface and the bottom surface of said first insulating layer, the first and second ends of the inductance connected to the capacitance, and a first portion of the first end traversing a second portion of the inductance; and*

*a second insulating layer disposed between and separating the first portion of the first end and the second portion of the inductance, thereby electrically closing without shorting out said resonant circuit and while the capacitance and the inductance formed on the one of the top and bottom surfaces of said first insulating layer.*

*35. A method of producing or manufacturing one or more resonant circuits disposed on a substrate of a radio frequency identification tag, comprising sequential, non-sequential or independent steps of:*

*disposing a single capacitor on the substrate;*

*disposing a single inductor coil having first and second ends on the substrate;*

*disposing an insulating layer between portions of the single capacitor and the single inductor coil that cross over each other, thereby separating the portions of the single capacitor and the single inductor coil that cross over each other; and*

*electrically connecting the first and second ends of the inductor coil to the single capacitor with the insulating layer disposed between the portions, thereby electrically closing the one or more resonant circuits without shorting out same.*

*36. The method as in claim 35, wherein at least one of said disposing steps is accomplished by etching the substrate of the radio frequency identification tag which has been coated with a layer of conductive material.*

*37. The method as in claim 35, wherein at least one of said disposing steps is accomplished by printing onto or pressing into the substrate of the radio frequency identification tag a conductive material.*

*38. A method of producing or manufacturing one or more resonant circuits including a single capacitor and a single inductor coil having first and second ends and each disposed on a same side of a substrate of a radio frequency identification tag, comprising sequential, non-sequential or independent steps of:*

*disposing an insulating layer between portions of the single capacitor and the single inductor coil that cross over each other, thereby separating the portions of the single capacitor and the single inductor coil that cross over each other; and*

*electrically connecting the first and second ends of the inductor coil to the single capacitor with the insulating layer disposed between the portions, thereby electrically closing the one or more resonant circuits without shorting out same.*

*39. The method as in claim 38, wherein at least one of said disposing steps is accomplished by etching the substrate of the radio frequency identification tag which has been coated with a layer of conductive material.*

*40. The method as in claim 38, wherein at least one of said disposing steps is accomplished by printing onto or pressing into the substrate of the radio frequency identification tag a conductive material.*

* * * * *